(12) United States Patent
Wang

(10) Patent No.: US 11,832,121 B2
(45) Date of Patent: *Nov. 28, 2023

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/457,199

(22) Filed: Dec. 1, 2021

(65) Prior Publication Data

US 2022/0086674 A1 Mar. 17, 2022

Related U.S. Application Data

(63) Continuation of application No. 17/223,388, filed on Apr. 6, 2021, now Pat. No. 11,246,052, which is a (Continued)

(51) Int. Cl.
*H04W 24/10* (2009.01)
*H04W 76/11* (2018.01)
(Continued)

(52) U.S. Cl.
CPC ..... *H04W 24/10* (2013.01); *H04W 36/00835* (2018.08); *H04W 36/08* (2013.01); *H04W 56/001* (2013.01); *H04W 76/11* (2018.02)

(58) Field of Classification Search
None
See application file for complete search history.

(56) References Cited

U.S. PATENT DOCUMENTS

| 2013/0114446 A1 | 5/2013 | Liu et al. |
| 2014/0295847 A1 | 10/2014 | Futaki |

(Continued)

FOREIGN PATENT DOCUMENTS

| CN | 104581696 A | 4/2015 |
| CN | 109150362 A | 1/2019 |

(Continued)

OTHER PUBLICATIONS

Notice of Reasons for Refusal for Japanese Application No. 2021-540586 dated Aug. 5, 2022. 16 pages with English translation.

(Continued)

*Primary Examiner* — Saba Tsegaye
(74) *Attorney, Agent, or Firm* — PERKINS COIE LLP

(57) ABSTRACT

A wireless communication method, a terminal device and a network device are provided. The terminal device in an idle or de-activated state can carry out cell measurement on the basis of the configuration of the network device. After entering a connected state, the measurement result is reported to assist the network device in configuring an auxiliary cell and/or auxiliary cell group in a CA, and/or, assist in configuring a multi-wireless access technology dual connection. The wireless communication method includes that the terminal device receives first configuration information sent by the network device, the first configuration information being used to indicate the terminal device in an idle state and/or de-activated state to carry out cell measurement and including first measurement information for E-UTRAN and/or second measurement information for NR, and the terminal device carries out cell measurement according to the first configuration information.

16 Claims, 5 Drawing Sheets

Related U.S. Application Data continuation of application No. PCT/CN2019/073527, filed on Jan. 28, 2019.

(51) Int. Cl.
  H04W 36/00 (2009.01)
  H04W 36/08 (2009.01)
  H04W 56/00 (2009.01)

(56) References Cited

U.S. PATENT DOCUMENTS

| | | |
|---|---|---|
| 2014/0370914 A1 | 12/2014 | Jung et al. |
| 2017/0111884 A1 | 4/2017 | Sadeghi et al. |
| 2018/0192365 A1 | 7/2018 | Feng |
| 2018/0270682 A1 | 9/2018 | Zacharias et al. |
| 2019/0281441 A1 | 9/2019 | Huang et al. |
| 2020/0029237 A1 | 1/2020 | Kim et al. |
| 2020/0120518 A1 | 4/2020 | Geng et al. |
| 2020/0187033 A1* | 6/2020 | Tang ............... H04W 36/00835 |
| 2021/0067999 A1 | 3/2021 | Yang |

FOREIGN PATENT DOCUMENTS

| | | |
|---|---|---|
| CN | 109150451 A | 1/2019 |
| CN | 108696881 B | 6/2021 |
| CN | 108141774 B | 9/2021 |
| EP | 3477880 A1 | 5/2019 |
| JP | 2009111636 A | 5/2009 |
| KR | 10-2018-0108150 A | 10/2018 |
| KR | 10-2019-0002367 A | 1/2019 |
| WO | 2018174654 A1 | 9/2018 |
| WO | 2018174676 A1 | 9/2018 |
| WO | 2018228333 A1 | 12/2018 |
| WO | 2019004784 A1 | 1/2019 |
| WO | 2019014892 A1 | 1/2019 |

OTHER PUBLICATIONS

OPPO "Further Discussion on UE behaviour for Idle Mode Measurement with Validity Area" R2-1806708; 3GPP TSG-RAN2 Meeting #102; Busan, Korea; May 21-25, 2018. 4 pages.
Second Office Action for Chinese Application No. 2021104288041 dated Sep. 30, 2022. 20 pages with English translation.
3GPP TS 38.331 V16.2.0 (Sep. 2020)—3rd Generation Partnership Project; Technical Specification Group Radio Access Network; NR; Radio Resource Control (RRC) protocol specification (Release 16) (921 pages).
3GPP TSG-RAN2 Meeting #78–Prague, Czech Republic, May 21-25, 2012—xR2-122812—MediaTek, Multi-PLMN support (37 pages).
International Search Report dated Nov. 13, 2019 of PCT/CN2019/073527 (4 pages).
Non-Final Office Action dated Jun. 18, 2021 of U.S. Appl. No. 17/223,388, filed Apr. 6, 2021.
Notice of Allowance dated Oct. 4, 2021 of U.S. Appl. No. 17/223,388, filed April 6, 2021.
Supplementary European Search Report dated Nov. 9, 2021 of European Patent Application No. 19913822.3 (9 pages).
Part 1 of 2—3GPP TS 36.300 V13.12.0 (Jun. 2018)—3rd Generation Partnership Project; Technical Specification Group Radio Access Network; Evolved Universal Terrestrial Radio Access (E-UTRA) and Evolved Universal Terrestrial Radio Access Network (E-UTRAN);Overall description; Stage 2 (Release 13) (pp. 1-150).
Part 2 of 2—3GPP TS 36.300 V13.12.0 (Jun. 2018)—3rd Generation Partnership Project; Technical Specification Group Radio Access Network; Evolved Universal Terrestrial Radio Access (E-UTRA) and Evolved Universal Terrestrial Radio Access Network (E-UTRAN);Overall description; Stage 2 (Release 13) (pp. 151-313).
3GPP TS 36.331 V16.2.1 (Sep. 2020)—3rd Generation Partnership Project; Technical Specification Group Radio Access Network; Evolved Universal Terrestrial Radio Access (E-UTRA);Radio Resource Control (RRC); Protocol specification (Release 16) (1,081 pages).
First Examination Report of the European application No. 19913822.3, dated Jun. 13, 2022. 6 pages.
First Office Action of the Chinese application No. 202110428804.1, dated May 6, 2022. 16 pages with English Translation.
Second Examination Report of the Australian application No. 2019425547, dated Jul. 27, 2022. 3 pages.
Examination Report for Indian Application No. 202117016350 dated Feb. 8, 2022. 5 pages with English translation.
Examination Report No. 1 for Australian Application No. 2019425547 dated Apr. 7, 2022. 5 pages.
Examination Report for European Application No. 19913822.3 dated Nov. 23, 2022. 7 pages.
Korean First Office Action with English Translation for KR Application 10-2021-7026439 dated Aug. 18, 2023, (17 pages).

* cited by examiner

WIRELESS COMMUNICATION METHOD, TERMINAL DEVICE AND NETWORK DEVICE

CROSS-REFERENCE TO RELATED APPLICATION

This application is a continuation application of the U.S. application Ser. No. 17/223,388, filed Apr. 6, 2021, now U.S. Pat. No. 11,246,052, which is a continuation application of International Application No. PCT/CN2019/073527 filed on Jan. 28, 2019. The entire disclosures of both of which are hereby incorporated by reference.

TECHNICAL FIELD

Implementations of the present disclosure relate to the field of communication, and more specifically, to a wireless communication method, a terminal device and a network device.

BACKGROUND

Carrier Aggregation (CA) technology can enable a terminal device to use multiple component carriers to send and receive data at the same time, improving data transmission rate and system operating efficiency. A Dual Connectivity (DC) scenario may be supported in a New Radio (NR) communication system. However, relevant configuration of a Secondary Cell (SCell) and/or Secondary Cell Group (SCG) are not considered in configurations of CA and DC, thereby quick activation or inactivation of the SCell and SCG cannot be realized.

SUMMARY

Implementations of the present disclosure provide a wireless communication method, a terminal device and a network device. A terminal device in an idle state or inactive state can perform cell measurement based on configuration of a network device, and report a measurement result after entering a connected state, to assist the network device to configure a secondary cell and/or secondary cell group in carrier aggregation (CA), and/or assisting the network device to configure multi-radio access technology dual connectivity (MR-DC).

In a first aspect, a wireless communication method is provided. The method includes: receiving, by a terminal device, first configuration information sent by a network device, wherein the first configuration information is used for indicating a terminal device in an idle state and/or an inactive state to perform cell measurement, and the first configuration information includes first measurement information for a first network and/or second measurement information for a second network, and wherein the terminal device is in the idle state or the inactive state; performing, by the terminal device, the cell measurement according to the first configuration information.

Optionally, the first network is an evolved universal terrestrial radio access network (E-UTRAN), and the second network is a New Radio (NR).

Optionally, the method may be applied to a carrier aggregation (CA) scenario and/or an MR-DC scenario.

It should be noted that the MR-DC may include (LTE NR DC, EN-DC), (NR eLTE DC, NE-DC), (5GC eLTE NR DC, 5GC-EN-DC) and NR DC, wherein, in the EN-DC a Long Term Evolution (LTE) node serves as a Master Node (MN) and an NR node serves as a Slave Node (SN), to connect with an Evolved Packet Core (EPC) core network. In the NE-DC, an NR serves as an MN node, and an Evolved Long Term Evolution (eLTE) serves as an SN node, to connect with a 5-Generation Core (5GC). In the 5GC-EN-DC, an eLTE serves as an MN node and an NR serves as an SN node, to connect with a 5GC. In the NR DC, an NR serves as an MN node and an NR is an SN node, to connect with a 5GC.

In a second aspect, a wireless communication method is provided. The method includes: sending, by a network device, first configuration information to a terminal device, wherein the first configuration information is used for indicating a terminal device in an idle state and/or an inactive state to perform cell measurement, and the first configuration information includes first measurement information for a first network and/or second measurement information for a second network, and wherein the terminal device is in the idle state or the inactive state.

Optionally, the first network is an E-UTRAN and the second network is an NR.

Optionally, the method may be applied to a CA scenario and/or an MR-DC scenario.

In a third aspect, there is provided a terminal device for performing the method according to the first aspect described above or various implementations thereof.

Specifically, the terminal device includes function modules for performing the method according to the first aspect described above or various implementations thereof.

In a fourth aspect, there is provided a network device for performing the method according to the second aspect described above or various implementations thereof.

Specifically, the network device includes function modules for performing the method according to the second aspect described above or various implementations thereof.

In a fifth aspect, there is provided a terminal device including a processor and a memory. The memory is configured to store a computer program, and the processor is configured to call and run the computer program stored in the memory to perform the method in the above first aspect or various implementations of the first aspect.

In a sixth aspect, there is provided a network device including a processor and a memory. The memory is configured to store a computer program, and the processor is configured to call and run the computer program stored in the memory to perform the method in the above second aspect or various implementations of the second aspect.

In a seventh aspect, there is provided a chip for implementing the method according to any of the first aspect and the second aspect described above or various implementations thereof.

Specifically, the chip includes a processor used for calling and running a computer program from a memory, so that a device mounted with the chip therein performs the method according to any of the first aspect and the second aspect described above or various implementations thereof.

In an eighth aspect, there is provided a computer readable storage medium used for storing a computer program that causes a computer to perform the method according to any of the first aspect and the second aspect described above or various implementations thereof.

In a ninth aspect, there is provided a computer program product including computer program instructions, wherein the computer program instructions enable a computer to execute the method in any one of the first aspect to the second aspect or in various implementations thereof.

In a tenth aspect, there is provided a computer program, which, when running on a computer, causes the computer to perform the method according to any of the first aspect and the second aspect described above or various implementations thereof.

DETAILED DESCRIPTION

Technical solutions in implementations of the present disclosure will be described below with reference to the drawings in implementations of the present disclosure. It is apparent that the implementations described are just some implementations of the present disclosure, but not all implementations of the present disclosure. With respect to the implementations of the present disclosure, all other implementations achieved by a person of ordinary skill in the art without paying an inventive effort are within the protection scope of the present disclosure.

Implementations of the present disclosure may be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an NR system evolution system, a LTE-based access to unlicensed spectrum (LTE-U) system, an NR-based access to unlicensed spectrum (NR-U) system, a Universal Mobile Telecommunications System (UMTS), a Wireless Local Area Network (WLAN), Wireless Fidelity (WiFi), a next generation communication system, or other communication systems.

Generally speaking, the number of connections supported by a traditional communication system is limited and easy to implement. However, with development of the communication technology, mobile communication systems will not only support traditional communication, but also support, for example, Device to Device (D2D) communication, Machine to Machine (M2M) communication, Machine Type Communication (MTC), or Vehicle to Vehicle (V2V) communication. The implementations of the present disclosure may also be applied to these communication systems.

Optionally, the communication system in the implementations of the present disclosure may be applied to a Carrier Aggregation (CA) scenario, a Dual Connectivity (DC) scenario, or a Standalone (SA) scenario.

The applied spectrum is not limited in the implementations of the present disclosure. For example, the implementations of the present disclosure may be applied to a licensed spectrum, or an unlicensed spectrum.

Figure 1:
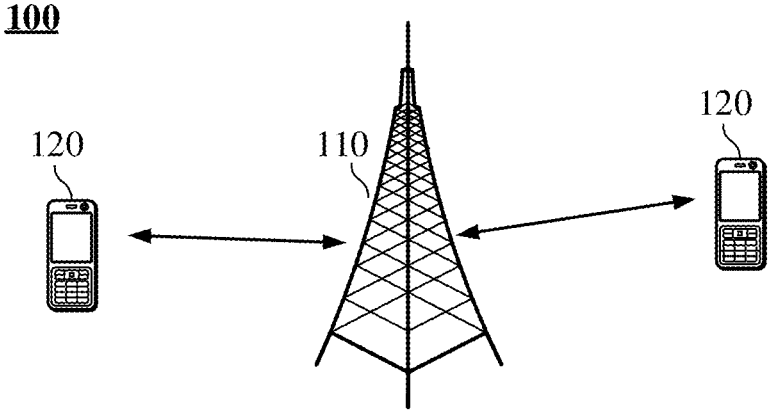
FIG. 1 is a schematic diagram of an architecture of a communication system according to an implementation of the present disclosure.

Illustratively, a communication system 100 to which an implementation of the present disclosure is applied is shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area.

FIG. 1 illustrates one network device and two terminal devices. Optionally, the communication system 100 may include multiple network devices, and other quantity of terminal devices may be included within the coverage area of each network device, which is not limited in implementations of the present disclosure.

Optionally, the communication system 100 may include other network entities such as a network controller, and a mobile management entity, which is not limited in implementations of the present disclosure.

It should be understood that, a device with a communication function in a network/system in the implementations of the present disclosure may be referred to as a communication device. The communication system 100 shown in FIG. 1 is taken as an example, the communication device may include a network device 110 and a terminal device 120 which have communication functions, and the network device 110 and the terminal device 120 may be the specific devices described above, which will not be described herein again. The communication device may also include other devices in the communication system 100, such as a network controller, a mobile management entity, and other network entities, which is not limited in the implementations of the present disclosure.

The implementations of the present disclosure describe various implementations in combination with a terminal device and a network device. Herein the terminal device may also be referred to as a User Equipment (UE), an access terminal, a subscriber unit, a subscriber station, a mobile station, a rover station, a remote station, a remote terminal, a mobile device, a user terminal, a terminal, a wireless communication device, a user agent, or a user device, etc. The terminal device may be a station (ST) in the WLAN, or may be a cellular phone, a cordless phone, a Session Initiation Protocol (SIP) phone, a Wireless Local Loop (WLL) station, a Personal Digital Assistant (PDA), a handheld device or a computing device with a wireless communication function, or other processing devices connected to a wireless modem, a vehicle-mounted device, a wearable device, or a terminal device in a next generation communication system, such as a terminal device in an NR network or a terminal device in a future evolved Public Land Mobile Network (PLMN).

By way of example and not limitation, in the implementations of the present disclosure, the terminal device may be a wearable device. The wearable device may also be called a wearable intelligent device, which is a general term of wearable devices designed intelligently and developed on daily wear using wearable technology, such as glasses, gloves, a watch, clothing and shoes. The wearable device is a portable device that is worn directly on a body or integrated into a user's clothes or accessories. The wearable device not only is a hardware device, but also implements powerful functions through software support, data interaction and cloud interaction. Generalized wearable intelligent device include a device with full features, a large size, and full or partial functions which may be implemented without relying on a smart phone, for example, a smart watch or smart glasses, as well as a device that is only focused on a certain application function and needs to be cooperated with other devices such as a smart phone, for example, a smart bracelet and a smart jewelry for various physical sign observations.

The network device may be a device for communicating with a mobile device, or may be an Access Point (AP) in the WLAN, or a Base Transceiver Station (BTS) in GSM or CDMA, or may be a NodeB (NB) in WCDMA, or an Evolutional Node B (eNB or eNodeB) in Long Term Evolution (LTE), or a relay station or an access point, or a vehicle-mounted device, a wearable device, a network device (gNB) in the NR network, or a network device in the future evolved PLMN network.

In the implementations of the present disclosure, the network device provides services for a cell, and the terminal device communicates with the network device through transmission resources (e.g., frequency domain resources or spectrum resources) used by the cell. The cell may be a cell corresponding to the network device (e.g., a base station), the cell may belong to a macro base station, or may belong to a base station corresponding to a Small cell which here may include a Metro cell, a Micro cell, a Pico cell, a Femto cell, etc. These small cells have features of small coverage and low transmission power, and are suitable for providing high-speed data transmission services.

It should be understood that in the implementations of the present disclosure the NR may be deployed independently. In order to reduce air interface signaling, quickly resume radio connection and quickly resume data service in a 5G network environment, a new Radio Resource Control (RRC) state, namely an RRC_INACTIVE state, is defined. This state is different from RRC_IDLE and RRC_CONNECTED states.

In RRC_IDLE state: mobility is UE-based cell selection and reselection, paging is initiated by a Core Network (CN), and a paging area is configured by the CN. There is no UE Access Stratum (AS) context and no RRC connection at a base station side.

In RRC_CONNECTED state: there is an RRC connection, and there is UE AS context on the base station and the UE. Location of the UE known by the network device is a location on a specific cell level. The mobility is controlled by the network device. Unicast data may be transmitted between the UE and the base station.

In RRC_INACTIVE state: mobility is UE-based cell selection and reselection, there is a connection between a CN and an NR, there is UE AS context on a certain base station, paging is triggered by a Radio Access Network (RAN), a RAN-based paging area is managed by the RAN, and the location of the UE known by the network device is a location on a RAN-based paging area level.

Figure 2:
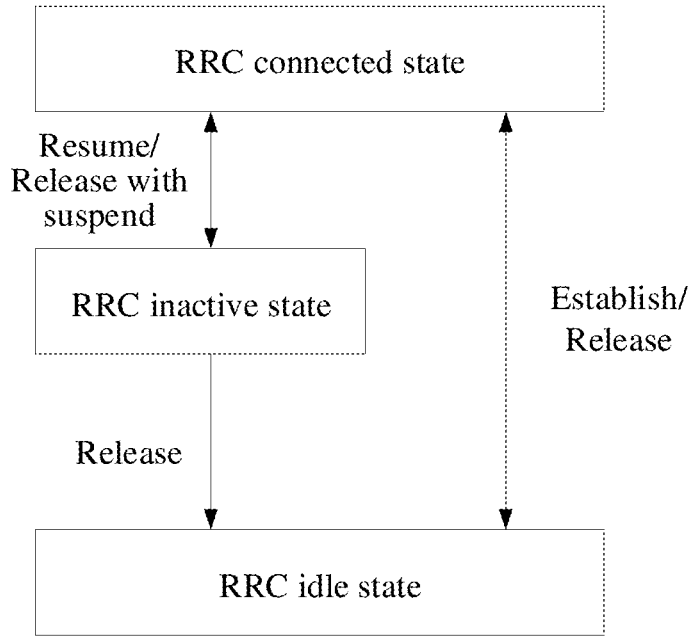
FIG. 2 is a schematic diagram of RRC state transition in an NR according to an implementation of the present disclosure.

The network device may control a state transition of the UE. For example, as shown in FIG. 2, the UE in the RRC_CONNECTED state may enter the RRC_IDLE state by releasing the RRC connection; the UE in the RRC_IDLE state may enter the RRC_CONNECTED state by establishing an RRC connection; the UE in the RRC_CONNECTED state may enter the RRC_INACTIVE state by releasing with suspend the RRC connection; the UE in the RRC_INACTIVE state may enter the RRC_CONNECTED state by resuming the RRC connection, or enter the RRC_IDLE state by releasing the RRC connection.

It should be noted that the UE in the RRC_INACTIVE state autonomously returns to the idle state under the following situations:
  when receiving an initial paging message from a CN;
  when an RRC resume request is initiated, a timer T319 is started, and if the timer expires;
  when integrity protection verification of a contention-based random access message 4 (MSG4) fails;
  when a cell is reselected to another Radio Access Technology (RAT);
  when entering a state of camping on any cell.

Characteristics of the RRC_INACTIVE state:
  connection between a RAN and a CN is retained;
  UE AS context is stored in the UE and at least one gNB;
  UE is reachable to a RAN side, and relevant parameters are configured by the RAN;
  Movement of UE in a RAN notification area (RNA) configured by the RAN is not needed to notify a network side (a core network device), but it is needed to notify the network side (the core network device) when the UE moves out of the RNA;
  Movement of UE in the RNA is based on a cell selection and reselection manner.

Figure 3:
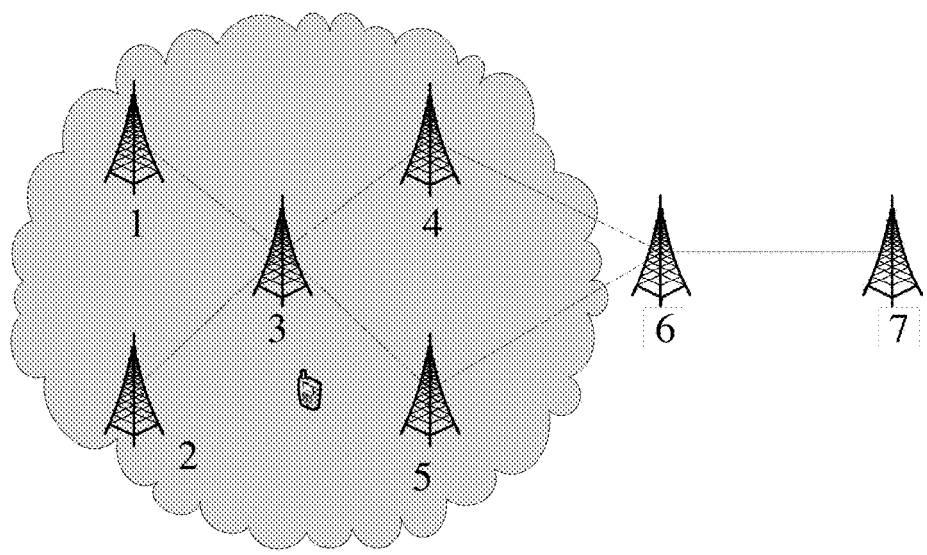
FIG. 3 is a schematic diagram of an RNA according to an implementation of the present disclosure.

It should be noted that the RNA may be specifically shown in FIG. 3, and in the RNA shown in FIG. 3, it is not needed to notify the network side when the UE moves between base station 1 and base station 5, but it is needed to notify the network side when the UE moves to base station 6 or base station 7.

When the UE is in the RRC_INACTIVE state, the network device configures configuration parameters of RRC_INACTIVE to the UE through RRC Release dedicated signaling, for example, configures an RNA which is used for controlling an area where the UE performs cell selection and reselection in the inactive state and is also an initial paging range area of the RAN.

The movement of UE in the RNA area is not needed to notify the network side, and complies with mobility behaviors in the idle state, that is, the principle of cell selection and reselection. When the UE moves out of the paging area configured by the RAN, the UE is triggered to resume an RRC connection and reacquire a paging area configured by the RAN. When downlink data for the UE arrives, a gNB which retains a connection between the RAN and the CN for the UE will trigger all cells in the RAN paging area to send a paging message to the UE, so that the UE in the INACTIVE state can resume the RRC connection and receive data. The UE in the INACTIVE state is configured with a RAN paging area, to ensure reachability of the UE in this area, the UE needs to update its location periodically according to a period configured by the network.

Therefore, a scenario in which the UE is triggered to perform RNA update include a scenario in which a RAN Notification Area Update (RNAU) timer expires or the UE moves to an area outside the RNA.

Figure 4:
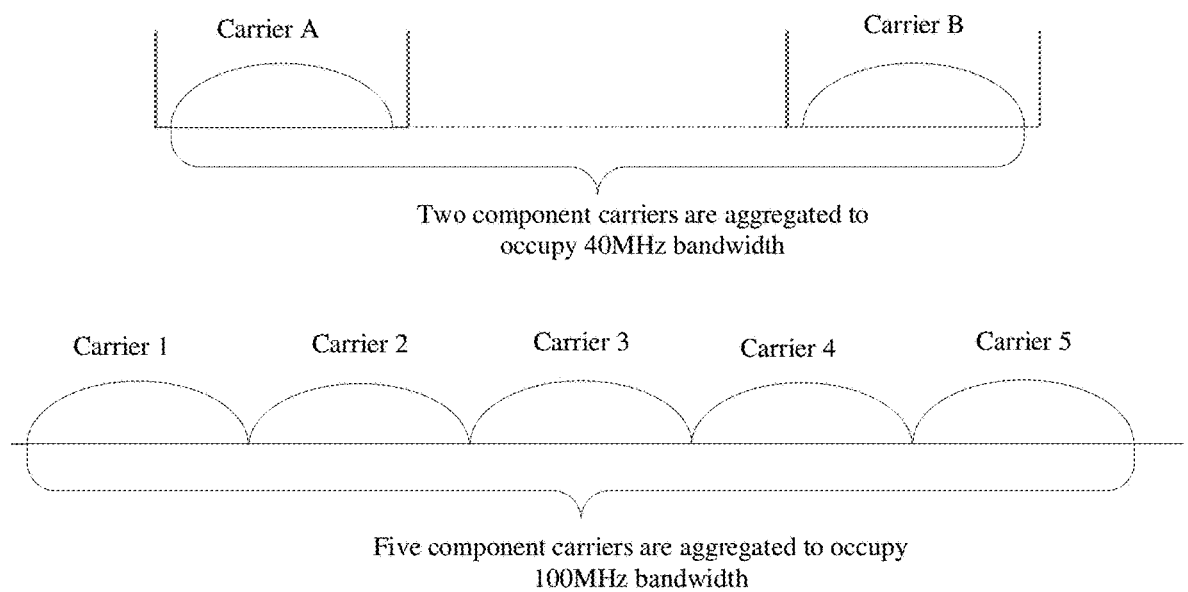
FIG. 4 is a schematic diagram of carrier aggregation according to an implementation of the present disclosure.

It should be understood that the implementations of the present disclosure may be applied to an NR Carrier Aggregation (CA) scenario, that is, by jointly scheduling and using resources on multiple Component Carriers (CCs), the NR system may support a larger bandwidth to be capable of achieving a higher system peak rate. As shown in FIG. 4, an aggregation of discontinuous carriers may be achieved, and two component carriers are carrier A and carrier B, respectively, which are discontinuous carriers, each occupies 20 MHz bandwidth, the carriers A and B occupy 40 MHz bandwidth in total. Or an aggregation of continuous carriers may be achieved, five component carriers are carrier 1 to carrier 5, respectively, and carrier 1 to carrier 5 are continuous carriers, each carrier occupies 20 MHz bandwidth, the five component carriers occupy 100 MHz bandwidth in total.

In the NR CA, there is only one Primary Cell Component (PCC), and the PCC provides RRC signaling connection, Non-Access Stratum (NAS) functions, security and so on. A Physical Uplink Control Channel (PUCCH) exists only on the PCC. Secondary Cell Component (SCC) only provides extra wireless resources. Both the PCC and the SCC are called serving cells. The standard also specifies that a maximum number of aggregated carriers is 5, that is, a maximum bandwidth after aggregation is 100 MHZ, and the aggregated carriers belong to the same base station. All aggregated carriers use the same cell radio network temporary identity (C-RNTI) to be implemented in the base station ensures that the C-RNTI does not collide in a cell where each carrier is located. Since asymmetric carrier aggregation and symmetric carrier aggregation are supported, it is required that the aggregated carrier must have downlink, and may have no uplink. In addition, it is certain that there are a Physical Downlink Control Channel (PDCCH) and PUCCH of the cell for the primary carrier cell, and only the primary carrier cell has the PUCCH, and other secondary carrier cells may have a PDCCH.

The SCell is configured through RRC dedicated signaling, and an initial configuration state is an inactive state, in which data cannot be sent and received. Then after the SCell is activated through a MAC CE, data can be sent and received. In terms of delay between the SCell configuration and activation, this architecture is not an optimal one. In addition, this delay reduces efficiency of CA usage and wireless resources, especially in a small cell deployment scenario. In a dense small cell deployment scenario, signaling load of each Scell is also very large, especially when each SCell needs to be configured separately. Therefore, the current CA architecture introduces extra delay, which limits the CA usage and reduces a gain of CA load sharing.

It should be understood that the implementations of the present disclosure may be applied to Dual Connectivity (DC) which may also be referred to an MR-DC scenario.

It should be noted that the MR-DC may include (LTE NR DC, EN-DC), (NR eLTE DC, NE-DC), (5GC eLTE NR DC, 5GC-EN-DC) and NR DC, wherein, in the EN-DC an LTE node serves as an MN node and an NR node serves as an SN node, to connect with an EPC core network. In the NE-DC, an NR node serves as an MN node, and an eLTE node serves as an SN node, to connect with a 5GC. In the 5GC-EN-DC, an eLTE serves as an MN node and an NR node serves as an SN node, to connect with a 5GC. In the NR DC, an NR node serves as an MN node and an NR node is an SN node, to connect with a 5GC.

Figure 5:
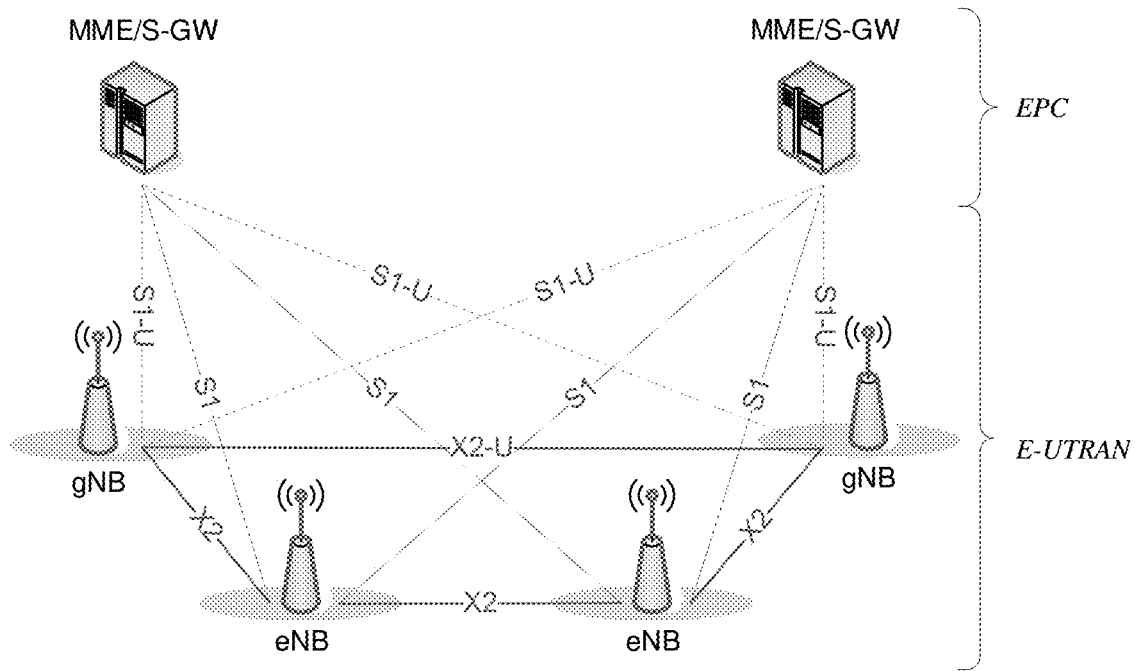
FIG. 5 is a schematic diagram of an EN-DC network architecture according to an implementation of the present disclosure.

For example, a network architecture of the EN-DC may be as shown in FIG. 5, in which an eNB serves as an MN node and a gNB serves as an SN node, and the eNB is connected with a Mobility Management Entity (MME) or Serving Gateway (S-GW) through an S1 interface, the gNB is connected with the MME or S-GW through an S1-U interface (a user side S1 interface), two eNBs are connected through an X2 interface, two gNBs are connected through an X2-U interface (a user side X2 interface), and the eNB and gNB are connected through an X2 interface. The eNB mainly realizes an RRC control function and a control plane function to the CN, and the gNB may configure auxiliary signaling, such as Signaling Radio Bearer 3 (SRB 3), which mainly provides data transmission function.

Regardless of the configuration for the CA or the configuration for the MR-DC, it is needed to reduce the delay between SCell configuration and activation and the delay between SCG configuration and activation, so as to meet increase of cell capacity especially in the small cell deployment scenario.

However, in the 5G NR, neither the configuration for the CA nor the configuration for the MR-DC considers optimization of the delay between SCell configuration and activation and the delay between SCG configuration and activation. However, the 5G cells are mostly covered by high frequency small cells, so it is necessary to reduce the delay between SCell configuration and activation and the delay between SCG configuration and activation. In addition, in the 5G NR, an RRC_INACTIVE state is introduced into the RRC state of the terminal device in addition to the RRC_IDLE state and RRC_CONNECTED state. In the RRC_INACTIVE state, it is also needed to reduce the delay between SCell configuration and activation and the delay between SCG configuration and activation, so as to meet increase of cell capacity especially in the small cell deployment scenario.

Figure 6:
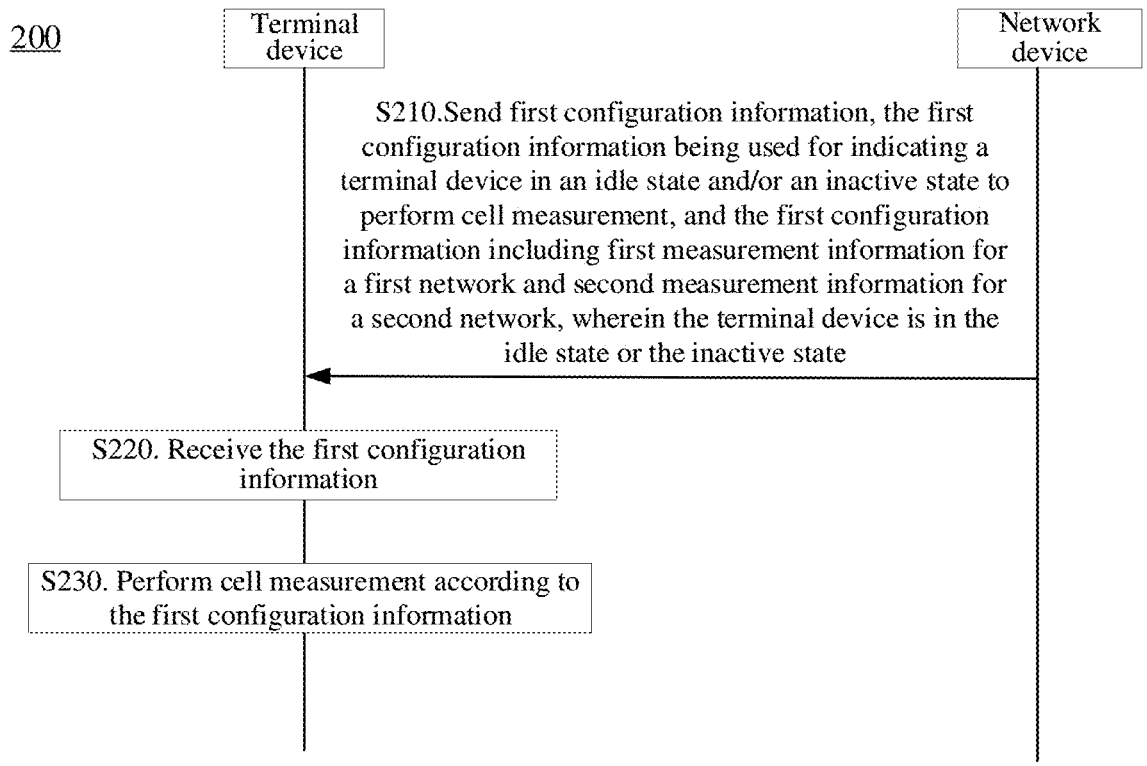
FIG. 6 is a schematic flowchart of a wireless communication method according to an implementation of the present disclosure.

FIG. 6 is a schematic flowchart of a wireless communication method 200 according to an implementation of the present disclosure. As shown in the FIG. 6, the method 200 may include the following acts S210-S230.

In S210, a network device sends first configuration information to a terminal device, wherein the first configuration information is used for indicating a terminal device in an idle state and/or an inactive state to perform cell measurement, and the first configuration information includes first measurement information for a first network and/or second measurement information for a second network, and wherein the terminal device is in the idle state or the inactive state.

In S220, the terminal device receives the first configuration information sent by the network device.

In S230, the terminal device performs cell measurement according to the first configuration information.

Optionally, the network device may send the first configuration information through RRC dedicated signaling or system broadcast information.

For example, the RRC dedicated signaling is RRC Release information.

Optionally, the first network is an E-UTRAN and the second network is an NR.

It should be noted that when the method 200 is applied to the MR-DC scenario, the first configuration information includes both first measurement information for an E-UTRAN and second measurement information for an NR, when the method 200 is applied to an LTE network, the first configuration information includes the first measurement information for the E-UTRAN, and when the method 200 is applied to an NR network, the first configuration information includes the second measurement information for the NR.

Optionally, in an implementation of the present disclosure, the network device may further configure a first timer, and the first timer is used for controlling validity of the first configuration information. For example, the terminal device receives second configuration information for configuring the first timer sent by the network device. That is, the first timer is started when the first configuration information is received, and the first configuration information is released when the first timer expires or stops.

It should be noted that the first timer is valid before expiration, and the first timer is invalid after expiration.

Optionally, the network device may send the second configuration information through RRC dedicated signaling or system broadcast information.

Optionally, when the network device sends the first configuration information through the RRC dedicated signaling, the terminal device receives the second configuration information for configuring the first timer sent by the network device.

It should be noted that the terminal device may acquire relevant configuration of the first timer and then receive the first configuration information.

Optionally, in an implementation of the present disclosure, the network device may further configure a filter coefficient. For example, the terminal device receives third configuration information sent by the network device, and the third configuration information is used for configuring a filter coefficient for the first configuration information, or the third configuration information is used for configuring a filter coefficient for each frequency.

Optionally, the network device may send the third configuration information through RRC dedicated signaling or system broadcast information.

Therefore, in the implementation of the present disclosure, the network device may indicate the terminal device in an idle state and/or inactive state to perform cell measurement through the first configuration information, and the terminal device in the idle state or inactive state may perform cell measurement according to the first configuration information. That is, the terminal device may perform cell measurement in the idle state or inactive state, and after entering a connected state, the terminal device reports a measurement result, to assist the network device to configure a secondary cell and/or secondary cell group in CA, and/or to assist the network device to multi-radio access technology dual connectivity, thereby rapid activation or inactivation of the secondary cell and/or secondary cell group may be achieved.

Optionally, in an implementation of the present disclosure, the first measurement information includes at least one type of the following information: a measurement frequency of the first network, a measurement bandwidth of the first network, a validity area range of measurement configuration, a cell list to be reported of the measurement configuration, a measurement quantity to be reported, and a threshold value for measurement reporting.

Optionally, in an implementation of the present disclosure, the second measurement information includes at least one type of the following information: a measurement frequency of the second network, a frequency band list in which the measurement frequency of the second network is located, a threshold value for evaluating cell signal quality, a maximum number of beams for evaluating cell signal quality, a time window for measurement, a subcarrier spacing of a synchronization signal block (SSB), an index set of SSBs to be measured, indication for acquiring a neighboring cell SSB index according to a serving cell SSB index, a validity area range of measurement configuration, a cell list to be reported of the measurement configuration, a measurement quantity to be reported, and a threshold value for measurement reporting.

Optionally, the measurement quantity to be measured and reported is directed to at least one of a Reference Signal Receiving Power (RSRP), a Reference Signal Receiving Quality (RSRQ), and a Signal to Interference plus Noise Ratio (SINR).

Optionally, the validity area range of the measurement configuration is at least one of a cell list, a tracking area (TA) list, a radio access network (RAN) area list, a system information area list and a validity area identity (ID) list.

It should be noted that the above cell list, TA list, RAN area list, system information area list and validity area ID list do not have to appear in a form of list, may also appear in other forms, which are not limited in the present disclosure.

Optionally, as example one, the validity area range of the measurement configuration is a cell list, and each cell in the cell list is identified by a cell ID. If a cell ID acquired through system broadcast information of a first cell is not included in the cell list, and the first cell is a cell to which the terminal device is handed over through cell reselection, the terminal device may perform one of the following operations:

stopping the first timer and releasing the first configuration information;

stopping measurement for the first configuration information, retaining the first configuration information, and if the terminal device returns to a cell range in the cell list before the first timer expires, restarting measurement for the first configuration information;

stopping measurement for the first configuration information, suspending the first timer, and retaining the first configuration information, and if the terminal device returns to the cell range in the cell list, starting the first timer, and restarting measurement for the first configuration information.

Optionally, as example two, the validity area range of the measurement configuration is a TA list, and each TA in the TA list is identified by a TA identity. If a TA identity acquired through system broadcast information of a first cell is not included in the TA list, and the first cell is a cell to which the terminal device is handed over through cell reselection, the terminal device may perform one of the following operations:

stopping the first timer and releasing the first configuration information;

stopping measurement for the first configuration information, retaining the first configuration information, and if the terminal device returns to a cell range in the cell list before the first timer expires, restarting measurement for the first configuration information;

stopping measurement for the first configuration information, suspending the first timer, and retaining the first configuration information, and if the terminal device returns to the cell range in the cell list, starting the first timer, and restarting measurement for the first configuration information.

Optionally, in the example two, the TA identity is a PLMN+a Tracking Area Code (TAC) or a TAC, herein the PLMN is a first PLMN in a PLMN list of the first cell.

It should be noted that the TA identity is a PLMN+ a TAC, which may be understood that the TA ID contains both the PLMN and TAC information at the same time.

Optionally, as example three, the validity area range of the measurement configuration is a RAN area list, and each RAN area in the RAN area list is identified by a RAN area identity. If a RAN area identity acquired through system broadcast information of a first cell is not included in the RAN area list, and the first cell is a cell to which the terminal device is handed over through cell reselection, the terminal device may perform one of the following operations:

stopping the first timer and releasing the first configuration information;

stopping measurement for the first configuration information, retaining the first configuration information, and if the terminal device returns to a cell range in the cell list before the first timer expires, restarting measurement for the first configuration information;

stopping measurement for the first configuration information, suspending the first timer, and retaining the first configuration information, and if the terminal device returns to the cell range in the cell list, starting the first timer, and restarting measurement for the first configuration information.

Optionally, in the example three, the RAN area identity is a PLMN+ a TAC+ a RAN area code or a TAC+ a RAN area code or a RAN area code, herein the PLMN is a first PLMN in a PLMN list of the first cell.

It should be noted that the RAN area identity is a PLMN+ a TAC+ a RAN area code, which may be understood that the RAN area identity contains the PLMN, TAC and RAN area code information at the same time. The RAN area identity is a TAC+ a RAN area code, which may be understood that the RAN area identity contains both the TAC and RAN area code information at the same time.

Optionally, as example four, the validity area range of the measurement configuration is a system information area list, and each system information area in the system information area list is identified by a system information area identity. If a system information area identity acquired through system broadcast information of a first cell is not included in the system information area list, and the first cell is a cell to which the terminal device is handed over through cell reselection, the terminal device may perform one of the following operations:

stopping the first timer and releasing the first configuration information;

stopping measurement for the first configuration information, retaining the first configuration information, and if the terminal device returns to a cell range in the cell list before the first timer expires, restarting measurement for the first configuration information; or stopping measurement for the first configuration information, suspending the first timer, and retaining the first configuration information, and if the terminal device returns to the cell range in the cell list, starting the first timer, and restarting measurement for the first configuration information.

Optionally, as example five, the validity area range of the measurement configuration is a validity area ID list. If a validity area ID acquired through system broadcast information of a first cell is not included in the validity area ID list, and the first cell is a cell to which the terminal device is handed over through cell reselection, the terminal device may perform one of the following operations:

stopping the first timer and releasing the first configuration information; or stopping measurement for the first configuration information, retaining the first configuration information, and if the terminal device returns to a cell range in the cell list before the first timer expires, restarting measurement for the first configuration information; or stopping measurement for the first configuration information, suspending the first timer, and retaining the first configuration information, and if the terminal device returns to the cell range in the cell list, starting the first timer, and restarting measurement for the first configuration information.

Optionally, in the implementation of the present disclosure, if the validity area range of the measurement configuration is not configured in the first configuration information, the terminal device may determine that the validity area range is at least one of a TA to which the first cell belongs, a current RAN area, a current system information area, a current RAN notification area, and an area identified by a validity area ID acquired through system broadcast information of the first cell, herein the first cell is a cell to which the terminal device is handed over through cell reselection.

Optionally, if the terminal device is in an inactive state, the validity area range of the measurement configuration is not larger than a range of a RAN paging area.

Optionally, as example six, if the system broadcast information of the first cell indicates that the first cell does not support measurement reporting for the first configuration information, and the first cell is a cell to which the terminal device is handed over through cell reselection, the terminal device may perform one of the following operations:

stopping measurement for the first configuration information, retaining the first configuration information, and suspending the first timer;

stopping measurement for the first configuration information, retaining the first configuration information, and continuing running of the first timer;

stopping measurement for the first configuration information, stopping the first timer, and releasing the first configuration information;

continuing measurement for the first configuration information, and after the terminal device enters a connected state, deleting a measurement result for the first configuration information and releasing the first configuration information.

Optionally, as example seven, if the terminal device receives the first configuration information through system broadcast information, when the terminal device is handed over to the first cell through cell reselection, the terminal device may perform the following operations:

if the first configuration information is not broadcast in the first cell, retaining the first configuration information; or if the first configuration information is broadcast in the first cell, retaining the first configuration information; or if the first configuration information is broadcast in the first cell, reacquiring the first configuration information.

Optionally, as example eight, if the terminal device receives the first configuration information through RRC dedicated signaling, when the terminal device is handed over to the first cell through cell reselection, the terminal device may perform the following operations:

retaining the first configuration information.

That is, regardless of whether the first configuration information is broadcast in the first cell, the terminal device retains the first configuration information.

It should be noted that in examples one to eight above, retaining the first configuration information by the terminal device may be understood that the terminal device stores and maintains the first configuration information. Reacquiring the first configuration information by the terminal device may be understood as releasing original first configuration information and acquiring new first configuration information.

Optionally, as example nine, if the terminal device supports a first type of dual connectivity communication or a second type of dual connectivity communication and a frequency where a current serving cell is located is an NR frequency, in the first type of dual connectivity communication a long-term evolution (LTE) node serves as a master node, a new radio (NR) node serves as a slave node, to connect with an evolved packet core (EPC) core network, in the second type of dual connectivity communication an NR node serves as a master node, an evolved long-term evolution (eLTE) node serves as a slave node, to connect with a 5G core network.

The terminal device may specifically perform cell measurement based on the following ways:
- if the terminal device supports a frequency band combination of a frequency band corresponding to the frequency where the current serving cell is located and a frequency band corresponding to a measurement frequency of the first network, the terminal device performs cell measurement according to the first measurement information and the second measurement information; or
- if the terminal device does not support a frequency band combination of a frequency band corresponding to the frequency where the current serving cell is located and a frequency band corresponding to a measurement frequency of the first network, the terminal device ignores measurement configuration for the measurement frequency of the first network, or the terminal device removes a measurement result for the measurement frequency of the first network from a measurement result report for the first configuration information.

In the example eight above, the first type of dual connectivity communication may be an EN-DC or 5GC-EN-DC, and the second type of dual connectivity communication may be an NE-DC.

Optionally, as example ten, if the terminal device supports a first type of dual connectivity communication or a second type of dual connectivity communication, and a frequency where a current serving cell is located is an LTE frequency, in the first type of dual connectivity communication a long-term evolution (LTE) node serves as a master node, a new radio (NR) node serves as a slave node, to connect with an evolved packet core (EPC) core network, in the second type of dual connectivity communication an NR node serves as a master node, an evolved long-term evolution (eLTE) node serves as a slave node, to connect with a 5G core network.

The terminal device may specifically perform cell measurement based on the following ways:
- if the terminal device supports a frequency band combination of a frequency band corresponding to the frequency where the current serving cell is located and a frequency band corresponding to a measurement frequency of the second network, the terminal device performs cell measurement according to the first measurement information and the second measurement information; or
- if the terminal device does not support a frequency band combination of a frequency band corresponding to the frequency where the current serving cell is located and a frequency band corresponding to a measurement frequency of the second network, the terminal device ignores measurement configuration for the measurement frequency of the second network, or the terminal device removes a measurement result for the measurement frequency of the second network from a measurement result report for the first configuration information.

In the example nine above, the first type of dual connectivity communication may be an EN-DC or 5GC-EN-DC, and the second type of dual connectivity communication may be an NE-DC.

Optionally, as example eleven, if the terminal device supports a third type of dual connectivity communication or carrier aggregation (CA) for an NR network, and a frequency where a current serving cell is located is an NR frequency, in the third type of dual connectivity communication an NR node serves as a master node, an NR node serves as a slave node, to connect with a 5G core network.

The terminal device may specifically perform cell measurement based on the following ways:
- if the terminal device supports a frequency band combination of a frequency band corresponding to the frequency where the current serving cell is located and a frequency band corresponding to a measurement frequency of the second network, the terminal device performs cell measurement according to the first measurement information and the second measurement information; or
- if the terminal device does not support a frequency band combination of a frequency band corresponding to the frequency where the current serving cell is located and a frequency band corresponding to a measurement frequency of the second network, the terminal device ignores measurement configuration for the measurement frequency of the second network, or the terminal device removes a measurement result for the measurement frequency of the second network from a measurement result report for the first configuration information.

In the example eleven above, the third type of dual connectivity communication may be an NR-DC.

Optionally, as example twelve, if the terminal device receives the first configuration information through the RRC dedicated signaling, when the first configuration information is released due to invalidity of the first configuration information and the first configuration information exists in system broadcast information of a current serving cell, the terminal device may perform the following operations:
- the terminal device acquires the first configuration information in the system broadcast information of the current serving cell, and performs cell measurement according to the first configuration information; or
- the terminal device determines whether to acquire the first configuration information in the system broadcast information of the current serving cell, and if determining to acquire the first configuration information in the system broadcast information of the current serving cell, the terminal device acquires the first configuration information and performs cell measurement according to the first configuration information; or
- the terminal device ignores the first configuration information in the system broadcast information of the current serving cell.

Optionally, as example thirteen, when the terminal device reselects from a cell in which the first configuration information is not broadcast in system broadcast information to a first cell, and the first configuration information exists in system broadcast information of the first cell, the terminal device may perform the following operations:

the terminal device acquires the first configuration information in the system broadcast information of the first cell, and performs cell measurement according to the first configuration information; or the terminal device determines whether to acquire the first configuration information in the system broadcast information of the first cell, and if determining to acquire the first configuration information in the system broadcast information of the first cell, the terminal device acquires the first configuration information and performs cell measurement according to the first configuration information; or the terminal device ignores the first configuration information in the system broadcast information of the first cell.

Optionally, in an implementation of the present disclosure, when the terminal device enters a connected state, the terminal device reports a measurement result for the first configuration information, wherein the measurement result is used for assisting the network device to configure a secondary cell and/or secondary cell group in CA, and/or the measurement result is used for assisting the network device to configure multi-radio access technology dual connectivity.

That is, in the implementation of the present disclosure, according to the measurement result the network device may configure the secondary cell and/or secondary cell group in carrier aggregation (CA), and/or configure multi-radio access technology dual connectivity.

Optionally, when the terminal device enters a connected state, the terminal device sends first indication information to the network device, wherein the first indication information is used for indicating that there is a measurement result to be reported for the first configuration information; when the network device receives the first indication information, the network device sends first request information to the terminal device, wherein the first request information is used for requesting to report the measurement result; when receiving the first request information, the terminal device reports the measurement result for the first configuration information.

Therefore, in the implementation of the present disclosure, the network device may configure the first configuration information for the terminal device in the idle state and/or inactive state, and the terminal device in the idle state or inactive state may perform cell measurement based on the configuration of the network device, and report the measurement result after entering the connected state, to assist the network device to quickly configure the secondary cell and/or secondary cell group in the CA, and/or to assist the network device to quickly configure multi-radio access technology dual connectivity. Thus, the quick activation or inactivation of the secondary cell and/or the secondary cell group can be realized, and the delay of activation or inactivation of the secondary cell and/or the secondary cell group can be reduced, to meet increase of cell capacity especially in the small cell deployment scenario.

Figure 7:
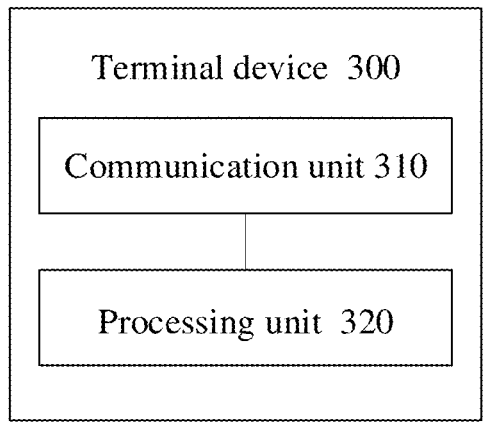
FIG. 7 is a schematic block diagram of a terminal device according to an implementation of the present disclosure.

FIG. 7 shows a schematic block diagram of a terminal device 300 according to an implementation of the present disclosure. As shown in FIG. 7, the terminal device 300 includes a communication unit 310 and a processing unit 320.

The communication unit 310 is configured to receive first configuration information, wherein the first configuration information is used for indicating a terminal device in an idle state and/or an inactive state to perform cell measurement, and the first configuration information includes first measurement information for a first network and/or second measurement information for a second network, and wherein the terminal device is in an idle state or an inactive state.

The processing unit 320 is configured to perform cell measurement according to the first configuration information.

Optionally, the first measurement information includes at least one type of the following information: a measurement frequency of the first network, a measurement bandwidth of the first network, a validity area range of measurement configuration, a cell list to be reported of the measurement configuration, a measurement quantity to be reported, and a threshold value for measurement reporting.

Optionally, the second measurement information includes at least one of the following:

a measurement frequency of the second network, a frequency band list in which the measurement frequency of the second network is located, a threshold value for evaluating cell signal quality, a maximum number of beams for evaluating cell signal quality, a time window for measurement, a subcarrier spacing of a synchronization signal block (SSB), an index set of SSBs to be measured, indication for acquiring a neighboring cell SSB index according to a serving cell SSB index, a validity area range of measurement configuration, a cell list to be reported of the measurement configuration, a measurement quantity to be reported, and a threshold value for measurement reporting.

Optionally, the communication unit 310 is further configured to receive second configuration information for configuring a first timer, wherein the first timer is used for controlling validity of the first configuration information.

Optionally, the validity area range of the measurement configuration is at least one of a cell list, a tracking area (TA) list, a radio access network (RAN) area list, a system information area list and a validity area identity (ID) list.

Optionally, the validity area range of the measurement configuration is a cell list, and each cell in the cell list is identified by a cell identity (ID), if a cell ID acquired through system broadcast information of a first cell is not included in the cell list, and the first cell is a cell to which the terminal device 300 is handed over through cell reselection, the processing unit 320 is further configured to perform one of the following operations:

stopping the first timer and releasing the first configuration information;

stopping measurement for the first configuration information, retaining the first configuration information, and if the terminal device returns to a cell range in the cell list before the first timer expires, restarting measurement for the first configuration information;

stopping measurement for the first configuration information, suspending the first timer, retaining the first configuration information, and if the terminal device 300 returns to a cell range in the cell list, starting the first timer, and restarting measurement for the first configuration information.

Optionally, the validity area range of the measurement configuration is a TA list, and each TA in the TA list is identified by a TA identity.

Optionally, if a TA identity acquired through system broadcast information of a first cell is not included in the TA list, and the first cell is a cell to which the terminal device 300 is handed over through cell reselection, the processing unit 320 is further configured to perform one of the following operations:

stopping the first timer and releasing the first configuration information;

stopping measurement for the first configuration information, retaining the first configuration information, and if the terminal device returns to a cell range in the cell list before the first timer expires, restarting measurement for the first configuration information;

stopping measurement for the first configuration information, suspending the first timer, retaining the first configuration information, and if the terminal device 300 returns to a cell range in the cell list, starting the first timer, and restarting measurement for the first configuration information.

Optionally, the TA identity is a public land mobile network (PLMN)+a tracking area code (TAC) or a TAC, wherein the PLMN is a first PLMN in a PLMN list of the first cell.

Optionally, the validity area range of the measurement configuration is a RAN area list, and each RAN area in the RAN area list is identified by a RAN area identity, if a RAN area identity acquired through system broadcast information of a first cell is not included in the RAN area list, and the first cell is a cell to which the terminal device 300 is handed over through cell reselection, the processing unit 320 is further configured to perform one of the following operations:

stopping the first timer and releasing the first configuration information;

stopping measurement for the first configuration information, retaining the first configuration information, and if the terminal device returns to a cell range in the cell list before the first timer expires, restarting measurement for the first configuration information;

stopping measurement for the first configuration information, suspending the first timer, retaining the first configuration information, and if the terminal device 300 returns to a cell range in the cell list, starting the first timer, and restarting measurement for the first configuration information.

Optionally, the RAN area identity is a PLMN+ a TAC+ a RAN area code or a TAC+ a RAN area code or a RAN area code, wherein the PLMN is a first PLMN in a PLMN list of the first cell.

Optionally, the validity area range of the measurement configuration is a system information area list, and each system information area in the system information area list is identified by a system information area identity.

If a system information area identity acquired through system broadcast information of a first cell is not included in the system information area list, and the first cell is a cell to which the terminal device 300 is handed over through cell reselection, the processing unit 320 is further configured to perform one of the following operations:

stopping the first timer and releasing the first configuration information;

stopping measurement for the first configuration information, retaining the first configuration information, and if the terminal device returns to a cell range in the cell list before the first timer expires, restarting measurement for the first configuration information;

stopping measurement for the first configuration information, suspending the first timer, retaining the first configuration information, and if the terminal device 300 returns to a cell range in the cell list, starting the first timer, and restarting measurement for the first configuration information.

Optionally, the validity area range of the measurement configuration is a validity area ID list, if a validity area ID acquired through system broadcast information of a first cell is not included in the validity area ID list, and the first cell is a cell to which the terminal device 300 is handed over through cell reselection, the processing unit 320 is further configured to perform one of the following operations:

stopping the first timer and releasing the first configuration information;

stopping measurement for the first configuration information, retaining the first configuration information, and if the terminal device returns to a cell range in the cell list before the first timer expires, restarting measurement for the first configuration information;

stopping measurement for the first configuration information, suspending the first timer, retaining the first configuration information, and if the terminal device 300 returns to a cell range in the cell list, starting the first timer, and restarting measurement for the first configuration information.

Optionally, if the validity area range of the measurement configuration is not configured in the first configuration information, the processing unit 320 is further configured to determine that the validity area range is at least one of a TA to which the first cell belongs, a current RAN area, a current system information area, a current RAN notification area, and an area identified by a validity area ID acquired through system broadcast information of the first cell, wherein the first cell is a cell to which the terminal device 300 is handed over through cell reselection.

Optionally, the measurement quantity to be reported is directed to one of RSRP, RSRQ and SINR.

Optionally, if the terminal device 300 is in an inactive state, the validity area range of the measurement configuration is not larger than a range of a RAN paging area.

Optionally, the communication unit 310 is further configured to receive third configuration information, wherein the third configuration information is used for configuring a filter coefficient for the first configuration information, or the third configuration information is used for configuring a filter coefficient for each frequency.

Optionally, if the system broadcast information of the first cell indicates that the first cell does not support measurement reporting for the first configuration information, the first cell is a cell to which the terminal device 300 is handed over through cell reselection, and the processing unit 320 is further configured to, stop measurement for the first configuration information, retain the first configuration information, and suspend the first timer; or stop measurement for the first configuration information, retain the first configuration information, and continue running of the first timer; or stop measurement for the first configuration information, stop the first timer, and release the first configuration information; or continue measurement for the first configuration information, and after the terminal device enters a connected state, delete a measurement result for the first configuration information and release the first configuration information.

Optionally, if the terminal device 300 receives the first configuration information through system broadcast information, when the terminal device 300 is handed over to the first cell through cell reselection, the processing unit 320 is further configured to:

if the first configuration information is not broadcast in the first cell, retain the first configuration information; or if the first configuration information is broadcast in the first cell, retain the first configuration information; or if the first configuration information is broadcast in the first cell, reacquire the first configuration information.

Optionally, if the terminal device 300 receives the first configuration information through RRC dedicated signaling, the processing unit 320 is further configured to, when the terminal device 300 is handed over to the first cell through cell reselection, retain the first configuration information.

Optionally, if the terminal device 300 supports a first type of dual connectivity communication or a second type of dual connectivity communication and a frequency where a current serving cell is located is an NR frequency, wherein in the first type of dual connectivity communication a long-term evolution (LTE) node serves as a master node, a new radio (NR) node serves as a slave node, to connect with an evolved packet core (EPC) core network, in the second type of dual connectivity communication an NR node serves as a master node, an evolved long-term evolution (eLTE) node serves as a slave node, to connect with a 5G core network, the processing unit 320 is specifically configured to:

if the terminal device 300 supports a frequency band combination of a frequency band corresponding to the frequency where the current serving cell is located and a frequency band corresponding to a measurement frequency of the first network, perform cell measurement according to the first measurement information and the second measurement information; or if the terminal device 300 does not support a frequency band combination of a frequency band corresponding to the frequency where the current serving cell is located and a frequency band corresponding to a measurement frequency of the first network, ignore measurement configuration for the measurement frequency of the first network, or remove a measurement result for the measurement frequency of the first network from a measurement result report for the first configuration information.

Optionally, if the terminal device 300 supports a first type of dual connectivity communication or a second type of dual connectivity communication and a frequency where a current serving cell is located is an LTE frequency, wherein in the first type of dual connectivity communication a long-term evolution (LTE) node serves as a master node, a new radio (NR) node serves as a slave node, to connect with an evolved packet core (EPC) core network, in the second type of dual connectivity communication an NR node serves as a master node, an evolved long-term evolution (eLTE) node serves as a slave node, to connect with a 5G core network, the processing unit 320 is specifically configured to:

if the terminal device 300 supports a frequency band combination of a frequency band corresponding to the frequency where the current serving cell is located and a frequency band corresponding to a measurement frequency of the second network, perform cell measurement according to the first measurement information and the second measurement information; or if the terminal device 300 does not support a frequency band combination of a frequency band corresponding to the frequency where the current serving cell is located and a frequency band corresponding to a measurement frequency of the second network, ignore measurement configuration for the measurement frequency of the second network, or remove a measurement result for the measurement frequency of the second network from a measurement result report for the first configuration information.

Optionally, if the terminal device 300 supports a third type of dual connectivity communication or a carrier aggregation (CA) for an NR network, and a frequency where a current serving cell is located is an NR frequency, wherein in the third type of dual connectivity communication an NR node serves as a master node, an NR node serves as a slave node, to connect with a 5G core network, the processing unit 320 is specifically configured to:

if the terminal device 300 supports a frequency band combination of a frequency band corresponding to the frequency where the current serving cell is located and a frequency band corresponding to a measurement frequency of the second network, perform cell measurement according to the first measurement information and the second measurement information; or if the terminal device 300 does not support a frequency band combination of a frequency band corresponding to the frequency where the current serving cell is located and a frequency band corresponding to a measurement frequency of the second network, ignore measurement configuration for the measurement frequency of the second network, or remove a measurement result for the measurement frequency of the second network from a measurement result report for the first configuration information.

Optionally, the communication unit 310 is specifically configured to receive the first configuration information through RRC dedicated signaling or system broadcast information.

Optionally, if the terminal device 300 receives the first configuration information through the RRC dedicated signaling, when the first configuration information is released due to invalidity of the first configuration information and the first configuration information exists in system broadcast information of a current serving cell, the processing unit 320 is further configured to:

acquire the first configuration information in the system broadcast information of the current serving cell, and perform cell measurement according to the first configuration information; or determine whether to acquire the first configuration information in the system broadcast information of the current serving cell, and if determining to acquire the first configuration information in the system broadcast information of the current serving cell, acquire the first configuration information and perform cell measurement according to the first configuration information; or ignore the first configuration information in the system broadcast information of the current serving cell.

Optionally, when the terminal device 300 reselects from a cell in which the first configuration information is not broadcast in system broadcast information to a first cell, and the first configuration information exists in system broadcast information of the first cell, the processing unit 320 is further configured to:

acquire the first configuration information in the system broadcast information of the first cell, and perform cell measurement according to the first configuration information; or determine whether to acquire the first configuration information in the system broadcast information of the first cell, and if determining to acquire the first configuration information in the system broadcast information of the first cell, acquire the first configuration information and perform cell measurement according to the first configuration information; or ignore the first configuration information in the system broadcast information of the first cell.

Optionally, when the terminal device 300 enters a connected state, the communication unit 310 is further configured to report a measurement result for the first configuration information, wherein the measurement result is used for assisting the network device to configure a secondary cell and/or secondary cell group in CA, and/or the measurement result is used for assisting the network device to configure multi-radio access technology dual connectivity.

Optionally, the first network is an E-UTRAN and the second network is an NR.

It should be understood that the terminal device 300 according to the implementation of the present disclosure may correspond to the terminal device in the method implementation of the present disclosure, and the above-mentioned and other operations and/or functions of various units in the terminal device 300 are respectively for implementing the corresponding processes of the terminal device in the method 200 shown in FIG. 6, which will not be repeated here for sake of conciseness.

Figure 8:
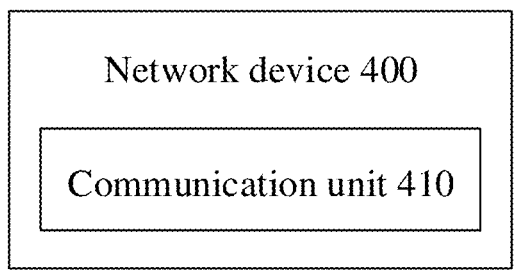
FIG. 8 is a schematic block diagram of a network device according to an implementation of the present disclosure.

FIG. 8 shows a schematic block diagram of a network device 400 according to an implementation of the present disclosure. As shown in FIG. 8, the network device 400 includes a communication unit 410.

The communication unit 410 is configured to send first configuration information, wherein the first configuration information is used for indicating a terminal device in an idle state and/or an inactive state to perform cell measurement, and the first configuration information includes first measurement information for a first network and/or second measurement information for a second network, and wherein the terminal device is in an idle state or an inactive state.

Optionally, the first measurement information includes at least one type of the following information: a measurement frequency of the first network, a measurement bandwidth of the first network, a validity area range of measurement configuration, a cell list to be reported of the measurement configuration, a measurement quantity to be reported, and a threshold value for measurement reporting.

Optionally, the second measurement information includes at least one type of the following information: a measurement frequency of the second network, a frequency band list in which the measurement frequency of the second network is located, a threshold value for evaluating cell signal quality, a maximum number of beams for evaluating cell signal quality, a time window for measurement, a subcarrier spacing of a synchronization signal block (SSB), an index set of SSBs to be measured, indication for acquiring a neighboring cell SSB index according to a serving cell SSB index, a validity area range of measurement configuration, a cell list to be reported of the measurement configuration, a measurement quantity to be reported, and a threshold value for measurement reporting.

Optionally, the communication unit 410 is further configured to send second configuration information for configuring a first timer, wherein the first timer is used for controlling validity of the first configuration information.

Optionally, the validity area range of the measurement configuration is at least one of a cell list, a tracking area (TA) list, a radio access network (RAN) area list, a system information area list and a validity area identity (ID) list.

Optionally, the validity area range of the measurement configuration is a cell list, and each cell in the cell list is identified by a cell identity (ID); or the validity area range of the measurement configuration is a TA list, and each TA in the TA list is identified by a TA identity, wherein the TA identity is a public land mobile network (PLMN)+a tracking area code (TAC) or a TAC, wherein the PLMN is a first PLMN in a PLMN list of the first cell;

the validity area range of the measurement configuration is a RAN area list, and each RAN area in the RAN area list is identified by a RAN area identity, wherein the RAN area identity is a PLMN+ a TAC+ a RAN area code or a TAC+ a RAN area code or a RAN area code, wherein the PLMN is a first PLMN in the PLMN list of the first cell;

the validity area range of the measurement configuration is a system information area list, and each system information area in the system information area list is identified by a system information area identity.

Optionally, the measurement quantity to be reported is directed to at least one of RSRP, RSRQ and SINR.

Optionally, if the terminal device is in an inactive state, the validity area range of the measurement configuration is not larger than a range of a RAN paging area.

Optionally, the communication unit 410 is further configured to send third configuration information, wherein the third configuration information is used for configuring a filter coefficient for the first configuration information, or the third configuration information is used for configuring a filter coefficient for each frequency.

Optionally, the communication unit 410 is specifically configured to send the first configuration information through RRC dedicated signaling or system broadcast information.

Optionally, when the terminal device enters a connected state, the network device 400 further includes a processing unit 420.

The communication unit 410 is further configured to receive a measurement result for the first configuration information.

The processing unit 420 is configured to configure a secondary cell and/or secondary cell group in CA, and/or configure multi-radio access technology dual connectivity according to the measurement result.

Optionally, when the communication unit 410 does not receive the measurement result, the communication unit 410 is further configured to receive first indication information for indicating that there is a measurement result to be reported for the first configuration information; send first request information for requesting to report the measurement result.

Optionally, the first network is an E-UTRAN and the second network is an NR.

It should be understood that the network device 400 according to the implementation of the present disclosure may correspond to the network device in the method implementations of the present disclosure, and the above and other operations and/or functions of various units in the network device 400 are respectively for implementing the corresponding process of the network device in the method 200 shown in FIG. 6, which will not be repeated here for sake of conciseness.

Figure 9:
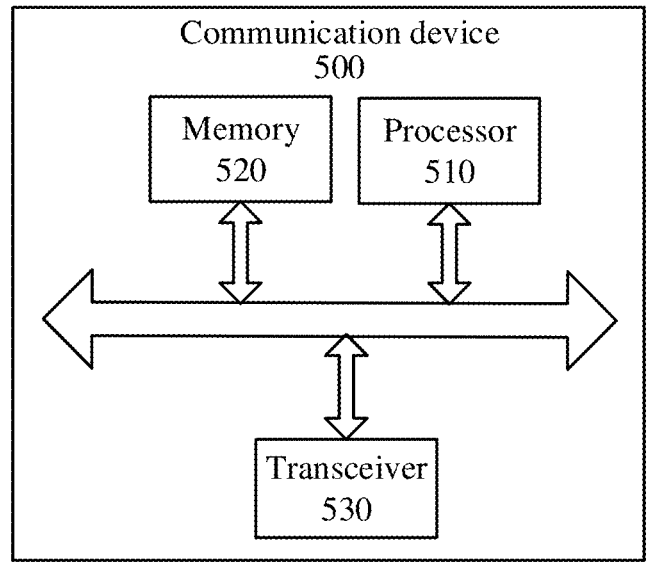
FIG. 9 is a schematic block diagram of a communication device according to an implementation of the present disclosure.

FIG. 9 is a schematic diagram of structure of a communication device 500 according to an implementation of the present disclosure. The communication device 500 shown in FIG. 9 includes a processor 510, which may call and run a computer program from a memory to implement the methods in the implementations of the present disclosure.

Optionally, as shown in FIG. 9, the communication device 500 may further include a memory 520. The processor 510 may call and run a computer program from the memory 520 to implement the methods in the implementations of the present disclosure.

The memory 520 may be a separate device independent of the processor 510 or may be integrated in the processor 510.

Optionally, as shown in FIG. 9, the communication device 500 may further include a transceiver 530, and the processor 510 may control the transceiver 530 to communicate with other devices. Specifically, the transceiver 530 may send information or data to other devices or receive information or data sent by other devices.

The transceiver 530 may include a transmitter and a receiver. The transceiver 530 may further include an antenna, and a number of antennas may be one or more.

Optionally, the communication device 500 may be a network device of the implementations of the present disclosure, and the communication device 500 may implement the corresponding processes implemented by the network device in various methods of the implementations of the present disclosure, which will not be repeated here for brevity.

Optionally, the communication device 500 may be specifically a mobile terminal/terminal device of the implementations of the present disclosure, and the communication device 500 may implement the corresponding processes implemented by the mobile terminal/terminal device in the various methods of the implementations of the present disclosure, which will not be repeated here for brevity.

Figure 10:
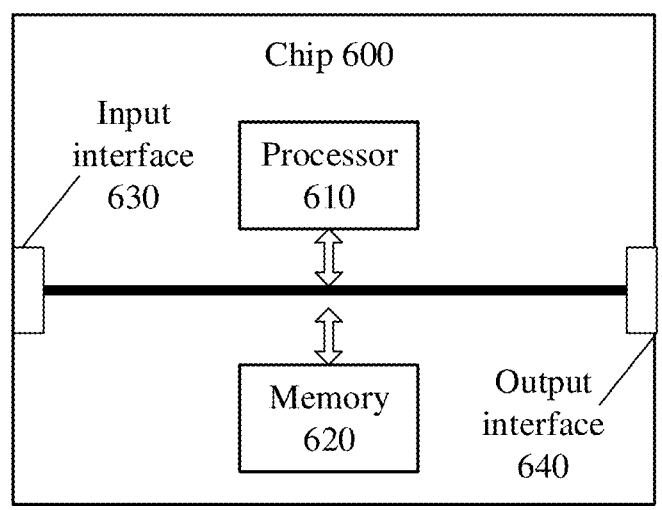
FIG. 10 is a schematic block diagram of a chip according to an implementation of the present disclosure.

FIG. 10 is a schematic diagram of structure of a chip according to an implementation of the present disclosure. A chip 600 shown in FIG. 10 includes a processor 610. The processor 610 may call and run a computer program from a memory to implement the methods in the implementations of the present disclosure.

Optionally, as shown in FIG. 10, the chip 600 may further include a memory 620. The processor 610 may call and run a computer program from the memory 620 to implement the methods in the implementations of the present disclosure.

The memory 620 may be a separate device independent of the processor 610 or may be integrated in the processor 610.

Optionally, the chip 600 may further include an input interface 630. The processor 610 may control the input interface 630 to communicate with other devices or chips. Specifically, the processor 710 may acquire information or data sent by other devices or chips.

Optionally, the chip 600 may further include an output interface 640. The processor 610 may control the output interface 640 to communicate with other devices or chips. Specifically, the processor 610 may output information or data to other devices or chips.

Optionally, the chip may be applied in a network device of the implementations of the present disclosure, and the chip may implement the corresponding processes implemented by the network device in various methods of the implementations of the present disclosure, which will not be repeated here for brevity.

Optionally, the chip may be applied in a mobile terminal/terminal device of the implementations of the present disclosure, and the chip may implement the corresponding processes implemented by the mobile terminal/terminal device in the various methods of the implementations of the present disclosure, which will not be repeated here for brevity.

It should be understood that the chip mentioned in the implementation of the present disclosure may be referred to as a system-level chip, a system chip, a chip system or a system-on-chip, etc.

Figure 11:
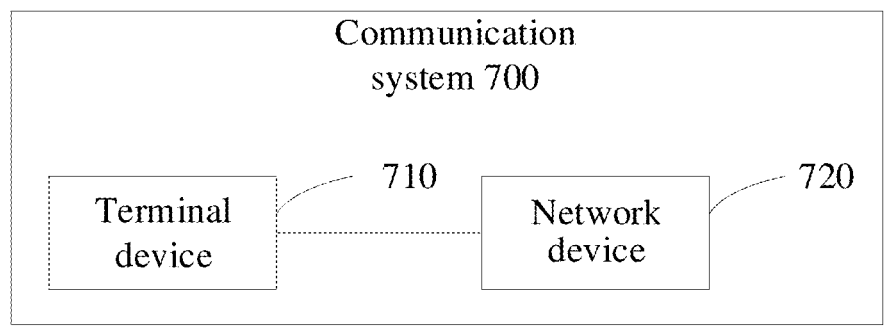
FIG. 11 is a schematic block diagram of a communication system according to an implementation of the present disclosure.

FIG. 11 is a schematic block diagram of a communication system 700 according to an implementation of the present disclosure. As shown in FIG. 11, the communication system 700 may include a terminal device 710 and a network device 720.

Herein, the terminal device 710 may be configured to implement the corresponding functions implemented by the terminal device in the above-mentioned methods and the network device 720 may be configured to implement the corresponding functions implemented by the network device in the above-mentioned methods, which will not be repeated here for brevity.

It should be understood that, the processor in the implementations of the disclosure may be an integrated circuit chip having a signal processing capability. In an implementation process, acts of the foregoing method implementations may be implemented by using an integrated logic circuit of hardware in the processor or instructions in a form of software. The processor may be a general purpose processor, a digital signal processor (DSP), an application specific integrated circuit (ASIC), a field programmable gate array (FPGA) or other programmable logic devices, a discrete gate or a transistor logic device, or a discrete hardware component. The processor may implement or perform methods, acts and logical block diagrams disclosed in the implementations of the present disclosure. The general purpose processor may be a microprocessor, or the processor may be any conventional processor or the like. The acts of the methods disclosed with reference to the implementations of the disclosure may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above methods in combination with its hardware.

It may be understood that, the memory in the implementations of the disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through illustrative but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memories in the systems and methods described in this specification are intended to include, but are not limited to, these and any other suitable types of memories.

It should be understood that, the above memory is an example for illustration and should not be construed as limiting. For example, optionally, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM) or the like. That is, memories in the implementations of the present disclosure are intended to include, but are not limited to, these and any other suitable types of memories.

An implementation of the present disclosure further provides a computer readable storage medium configured to store a computer program.

Optionally, the computer-readable storage medium may be applied in a network device of the implementations of the present disclosure, and the computer program enables the computer to perform the corresponding processes implemented by the network device in various methods of the implementations of the present disclosure, which will not be repeated here for brevity.

Optionally, the computer-readable storage medium may be applied in a mobile terminal/terminal device of the implementations of the present disclosure, and the computer program enables the computer to perform the corresponding processes implemented by the mobile terminal/terminal device in various methods of the implementations of the present disclosure, which will not be repeated here for brevity.

An implementation of the present disclosure also provides a computer program product including computer program instructions.

Optionally, the computer program product may be applied in a network device of the implementations of the present disclosure, and the computer program instructions enable the computer to perform the corresponding processes implemented by the network device in various methods of the implementations of the present disclosure, which will not be repeated here for brevity.

Optionally, the computer program product may be applied in a mobile terminal/terminal device of the implementations of the present disclosure, and the computer program instructions enable the computer to perform the corresponding processes implemented by the mobile terminal/terminal device in various methods according to the implementations of the present disclosure, which will not be repeated here for brevity.

An implementation of the present disclosure also provides a computer program.

Optionally, the computer program may be applied in a network device of the implementations of the present disclosure. When the computer program is run on the computer, the computer is enabled to perform the corresponding processes implemented by the network device in various methods of the implementations of the present disclosure, which will not be repeated here for brevity.

Optionally, the computer program may be applied in a mobile terminal/terminal device of the implementations of the present disclosure. When the computer program is run on the computer, the computer is enabled to perform the corresponding processes implemented by the mobile terminal/terminal device in various methods of the implementations of the present disclosure, which will not be repeated here for brevity.

Those of ordinary skill in the art will recognize that the example elements and algorithm acts described in combination with the implementations disclosed herein may be implemented in electronic hardware, or a combination of computer software and electronic hardware. Whether these functions are implemented in hardware or software depends on a specific application and design constraints of the technical solution. Skilled artisans may use different methods to implement the described functions in respect to each particular application, but such implementation should not be considered to be beyond the scope of the present disclosure.

Those skilled in the art may clearly understand that for convenience and conciseness of description, specific working processes of the systems, apparatuses and units described above may refer to the corresponding processes in the method implementations and will not be described here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division modes in actual implementation, for example, multiple units or components may be combined or integrated into another system, or some features may be ignored or not executed. On the other hand, the displayed or discussed mutual coupling or direct coupling or communication connection shown or discussed may be indirect coupling or communication connection through some interface, apparatus or unit. The indirect couplings or communication connections between apparatuses or units may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

When the functions are implemented in the form of software functional units and sold or used as an independent product, the software functional units may be stored in a computer-readable storage medium. Based on such an understanding, the technical solution of the present disclosure, in essence, or the part contributing to the prior art, or the part of the technical solution, may be embodied in the form of a software product stored in a storage medium. The computer software product is stored in a storage medium and includes several instructions for instructing a computer device (which may be a personal computer, a server, or a network device and the like) to perform all or part of the acts of the method described in various implementations of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but the protection scope of the present disclosure is not limited thereto. Any variation or substitution that may be readily conceived by a person skilled in the art within the technical scope disclosed by the present disclosure shall fall within the protection scope of

What I claim is:

1. A wireless communication method, comprising:
receiving, by a terminal device, first configuration information, wherein the first configuration information comprises first measurement information for a first network and/or second measurement information for a second network; wherein the first measurement information comprises a validity area range of measurement configuration, and the second measurement information comprises a validity area range of measurement configuration;
performing, by the terminal device, the cell measurement according to the first configuration information when the terminal device is in an idle state or an inactive state;
receiving, by the terminal device, second configuration information for configuring a first timer, wherein the first timer is used for controlling validity of the first configuration information;
wherein the validity area range of the measurement configuration is a cell list, and each cell in the cell list is identified by a cell ID, and the method further comprises:
if a cell ID acquired through broadcast of a first cell is not comprised in the cell list, and the first cell is a cell to which the terminal device is handed over through cell reselection, performing, by the terminal device, one of the following operations:
stopping the first timer and releasing the first configuration information;
stopping measurement for the first configuration information, retaining the first configuration information, and if the terminal device returns to a cell range in the cell list before the first timer expires, restarting measurement for the first configuration information;
stopping measurement for the first configuration information, suspending the first timer, and retaining the first configuration information, and if the terminal device returns to the cell range in the cell list, starting the first timer, and restarting measurement for the first configuration information.

2. The method of claim 1, wherein the first measurement information further comprises at least one type of the following information:
a measurement frequency of the first network, a measurement bandwidth of the first network, a cell list to be reported of the measurement configuration, a measurement quantity to be reported, and a threshold value for measurement reporting.

3. The method of claim 2, wherein the measurement quantity to be reported is directed to at least one of a reference signal receiving power (RSRP), a reference signal receiving quality (RSRQ), and a signal to interference plus noise ratio (SINR).

4. The method of claim 1, wherein the second measurement information further comprises at least one type of the following information:
a measurement frequency of the second network, a frequency band list in which the measurement frequency of the second network is located, a threshold value for evaluating cell signal quality, a maximum number of beams for evaluating cell signal quality, a time window for measurement, a subcarrier spacing of a synchronization signal block (SSB), an index set of SSBs to be measured, indication for acquiring a neighboring cell SSB index according to a serving cell SSB index, a cell list to be reported of the measurement configuration, a measurement quantity to be reported, and a threshold value for measurement reporting.

5. The method of claim 1, wherein if system broadcast information of the first cell indicates that the first cell does not support measurement reporting for the first configuration information, the first cell is a cell to which the terminal device is handed over through cell reselection, and the method further comprises:
stopping, by the terminal device, measurement for the first configuration information, retaining the first configuration information, and suspending the first timer; or
stopping, by the terminal device, measurement for the first configuration information, retaining the first configuration information, and continuing running of the first timer; or
stopping, by the terminal device, measurement for the first configuration information, stopping the first timer, and releasing the first configuration information; or
continuing, by the terminal device, measurement for the first configuration information, and after the terminal device enters a connected state, deleting a measurement result for the first configuration information and releasing the first configuration information.

6. The method of claim 1, wherein if the terminal device receives the first configuration information through system broadcast information, when the terminal device is handed over to a first cell through cell reselection, the method further comprises:
if the first configuration information is not broadcast in the first cell, retaining, by the terminal device, the first configuration information; or
if the first configuration information is broadcast in the first cell, retaining, by the terminal device, the first configuration information; or
if the first configuration information is broadcast in the first cell, reacquiring, by the terminal device, the first configuration information.

7. The method of claim 1, wherein if the terminal device receives the first configuration information through radio resource control (RRC) dedicated signaling, the method further comprises:
when the terminal device is handed over to a first cell through cell reselection, retaining, by the terminal device, the first configuration information.

8. The method of claim 1, wherein, if the terminal device supports a first type of dual connectivity communication or a second type of dual connectivity communication and a frequency where a current serving cell is located is an NR frequency, wherein in the first type of dual connectivity communication a long-term evolution (LTE) node serves as a master node, and a new radio (NR) node serves as a slave node, to connect with an evolved packet core (EPC) core network, in the second type of dual connectivity communication an NR node serves as a master node, and an evolved long-term evolution (eLTE) node serves as a slave node, to connect with a 5G core network;
performing, by the terminal device, the cell measurement according to the first configuration information comprises:
if the terminal device supports a frequency band combination of a frequency band corresponding to a frequency where the current serving cell is located and a frequency band corresponding to a measurement frequency of the first network, performing, by the terminal device, cell measurement according to the first measurement information and the second measurement information; or if the terminal device does not support a frequency band combination of a frequency band corresponding to a frequency where the current serving cell is located and a frequency band corresponding to a measurement frequency of the first network, ignoring, by the terminal device, measurement configuration for the measurement frequency of the first network, or removing, by the terminal device, a measurement result for the measurement frequency of the first network from a measurement result report for the first configuration information.

9. The method of claim 1, wherein, if the terminal device supports a first type of dual connectivity communication or a second type of dual connectivity communication and a frequency where a current serving cell is located is an LTE frequency, wherein in the first type of dual connectivity communication a long-term evolution (LTE) node serves as a master node, and a new radio (NR) node serves as a slave node, to connect with an evolved packet core (EPC) core network, in the second type of dual connectivity communication an NR node serves as a master node, and an evolved long-term evolution (eLTE) node serves as a slave node, to connect with a 5G core network;

performing, by the terminal device, the cell measurement according to the first configuration information comprises:

if the terminal device supports a frequency band combination of a frequency band corresponding to a frequency where the current serving cell is located and a frequency band corresponding to a measurement frequency of the second network, performing, by the terminal device, cell measurement according to the first measurement information and the second measurement information; or if the terminal device does not support a frequency band combination of a frequency band corresponding to a frequency where the current serving cell is located and a frequency band corresponding to a measurement frequency of the second network, ignoring, by the terminal device, measurement configuration for the measurement frequency of the second network, or removing, by the terminal device, a measurement result for the measurement frequency of the second network from a measurement result report for the first configuration information.

10. The method of claim 1, wherein if the terminal device supports a third type of dual connectivity communication or carrier aggregation (CA) for an NR network and a frequency where a current serving cell is located is an NR frequency, wherein in the third type of dual connectivity communication an NR node serves as a master node, and an NR node serves as a slave node, to connect with a 5G core network;

performing, by the terminal device, the cell measurement according to the first configuration information comprises:

if the terminal device supports a frequency band combination of a frequency band corresponding to a frequency where the current serving cell is located and a frequency band corresponding to a measurement frequency of the second network, performing, by the terminal device, cell measurement according to the first measurement information and the second measurement information; or if the terminal device does not support a frequency band combination of a frequency band corresponding to a frequency where the current serving cell is located and a frequency band corresponding to a measurement frequency of the second network, ignoring, by the terminal device, measurement configuration for the measurement frequency of the second network, or removing, by the terminal device, a measurement result for the measurement frequency of the second network from a measurement result report for the first configuration information.

11. The method of claim 1, wherein receiving, by the terminal device, the first configuration information comprises:

receiving, by the terminal device, the first configuration information through RRC dedicated signaling or system broadcast information;

wherein if the terminal device receives the first configuration information through the RRC dedicated signaling, when the first configuration information is released due to invalidity of the first configuration information and the first configuration information exists in system broadcast information of a current serving cell, the method further comprises:

acquiring, by the terminal device, the first configuration information in the system broadcast information of the current serving cell, and performing cell measurement according to the first configuration information; or determining, by the terminal device, whether to acquire the first configuration information in the system broadcast information of the current serving cell, and if determining to acquire the first configuration information in the system broadcast information of the current serving cell, acquiring the first configuration information and performing cell measurement according to the first configuration information; or ignoring, by the terminal device, the first configuration information in the system broadcast information of the current serving cell.

12. The method of claim 1, wherein before the terminal device enters a connected state, the method further comprises:

reporting, by the terminal device, a measurement result for the first configuration information, wherein the measurement result is used for assisting a network device to configure a secondary cell and/or a secondary cell group in carrier aggregation (CA), and/or the measurement result is used for assisting the network device to configure multi-radio access technology dual connectivity.

13. A terminal device, comprising a processor and a transceiver, wherein the transceiver is configured to receive first configuration information, wherein the first configuration information comprises first measurement information for a first network and/or second measurement information for a second network; wherein the first measurement information comprises a validity area range of measurement configuration, and the second measurement information comprises a validity area range of measurement configuration; and the processor is configured to perform cell measurement according to the first configuration information when the terminal device is in an idle state or an inactive state;

wherein the transceiver is further configured to receive second configuration information for configuring a first timer, wherein the first timer is used for controlling validity of the first configuration information;

wherein the validity area range of the measurement configuration is a cell list, and each cell in the cell list is identified by a cell ID, and the processor is configured to:

if a cell ID acquired through broadcast of a first cell is not comprised in the cell list, and the first cell is a cell to which the terminal device is handed over through cell reselection, perform one of the following operations:

stopping the first timer and releasing the first configuration information;

stopping measurement for the first configuration information, retaining the first configuration information, and if the terminal device returns to a cell range in the cell list before the first timer expires, restarting measurement for the first configuration information;

stopping measurement for the first configuration information, suspending the first timer, and retaining the first configuration information, and if the terminal device returns to the cell range in the cell list, starting the first timer, and restarting measurement for the first configuration information.

14. The terminal device of claim 13, wherein the first measurement information further comprises at least one type of the following information:

a measurement frequency of the first network, a measurement bandwidth of the first network, a cell list to be reported of the measurement configuration, a measurement quantity to be reported, and a threshold value for measurement reporting.

15. The terminal device of claim 13, wherein the second measurement information further comprises at least one type of the following information:

a measurement frequency of the second network, a frequency band list in which the measurement frequency of the second network is located, a threshold value for evaluating cell signal quality, a maximum number of beams for evaluating cell signal quality, a time window for measurement, a subcarrier spacing of a synchronization signal block (SSB), an index set of SSBs to be measured, indication for acquiring a neighboring cell SSB index according to a serving cell SSB index, a cell list to be reported of the measurement configuration, a measurement quantity to be reported, and a threshold value for measurement reporting.

16. A network device, comprising a processor and a transceiver, wherein the transceiver is configured to send first configuration information, wherein the first configuration information is used for indicating a terminal device to perform cell measurement when the terminal device is in an idle state and/or an inactive state, and the first configuration information comprises first measurement information for a first network and/or second measurement information for a second network;

wherein the first measurement information comprises a validity area range of measurement configuration, and the second measurement information comprises a validity area range of measurement configuration;

wherein the transceiver is further configured to send second configuration information for configuring a first timer, wherein the first timer is used for controlling validity of the first configuration information;

wherein the validity area range of the measurement configuration is a cell list, and each cell in the cell list is identified by a cell ID, if a cell ID acquired through broadcast of a first cell is not comprised in the cell list, and the first cell is a cell to which the terminal device is handed over through cell reselection, performing, by the terminal device, one of the following operations:

stopping the first timer and releasing the first configuration information;

stopping measurement for the first configuration information, retaining the first configuration information, and if the terminal device returns to a cell range in the cell list before the first timer expires, restarting measurement for the first configuration information;

stopping measurement for the first configuration information, suspending the first timer, and retaining the first configuration information, and if the terminal device returns to the cell range in the cell list, starting the first timer, and restarting measurement for the first configuration information.

* * * * *